(12) United States Patent
Herrmann et al.

(10) Patent No.: US 9,476,762 B2
(45) Date of Patent: Oct. 25, 2016

(54) INFRARED SENSOR WITH ACCELERATION SENSOR AND METHOD FOR OPERATING AN INFRARED SENSOR

(71) Applicant: Robert Bosch GmbH, Stuttgart (DE)

(72) Inventors: Ingo Herrmann, Friolzheim (DE); Christoph Schelling, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/382,102

(22) PCT Filed: Jan. 24, 2013

(86) PCT No.: PCT/EP2013/051305
§ 371 (c)(1),
(2) Date: Aug. 29, 2014

(87) PCT Pub. No.: WO2013/131683
PCT Pub. Date: Sep. 12, 2013

(65) Prior Publication Data
US 2015/0028207 A1    Jan. 29, 2015

(30) Foreign Application Priority Data
Mar. 5, 2012    (DE) .................. 10 2012 203 440

(51) Int. Cl.
*G01J 1/02*    (2006.01)
*H04N 5/33*    (2006.01)
(Continued)

(52) U.S. Cl.
CPC ............ *G01J 1/0238* (2013.01); *G01J 1/0228* (2013.01); *G01J 5/02* (2013.01); *G01J 5/026* (2013.01); *G01J 5/0846* (2013.01); *G01J 5/20* (2013.01);
(Continued)

(58) Field of Classification Search
CPC ........... G01J 2005/0077; G01J 1/0238; G01J 5/026; G01J 5/20; G01P 15/00; G01P 13/00; G01P 15/123; H04N 5/33
See application file for complete search history.

(56) References Cited

U.S. PATENT DOCUMENTS 6,279,478 B1    8/2001    Ringer et al.
2007/0060385 A1*    3/2007    Dohta ............................ 463/43
(Continued)

FOREIGN PATENT DOCUMENTS

DE    10 2006 028 435 A1    12/2007
DE    10 2008 041 587 A1    3/2010
(Continued)

OTHER PUBLICATIONS

International Search Report corresponding to PCT Application No. PCT/EP2013/051305, mailed May 14, 2013 (German and English language document) (5 pages).
D.L. Polla, et al., Integrated Multisensor Chip, IEEE Electron Device Letters, Apr. 1986, pp. 254-256, vol. 7—Issue 4.

*Primary Examiner* — Marcus Taningco
*Assistant Examiner* — Mindy Vu
(74) *Attorney, Agent, or Firm* — Maginot, Moore & Beck LLP

(57) ABSTRACT

A sensor arrangement includes an infrared sensor and at least one acceleration sensor. The infrared sensor is configured to detect infrared radiation, and to output infrared image data. The at least one acceleration sensor is configured to detect an instantaneous acceleration of the sensor arrangement, and to output acceleration data. The output of the infrared image data from the infrared sensor is blocked when the instantaneous acceleration of the sensor arrangement exceeds a preprogrammed threshold value.

10 Claims, 3 Drawing Sheets

(51) Int. Cl.
  *G01J 5/02* (2006.01)
  *G01J 5/20* (2006.01)
  *G01J 5/08* (2006.01)
  *G01P 15/09* (2006.01)
  *G01P 15/12* (2006.01)
  *G01P 15/125* (2006.01)
  *G01P 13/00* (2006.01)
  *G01J 5/50* (2006.01)
  *G01P 15/00* (2006.01)
  *G01J 5/00* (2006.01)

(52) U.S. Cl.
  CPC ............... *G01J 5/505* (2013.01); *G01P 13/00* (2013.01); *G01P 15/00* (2013.01); *G01P 15/09* (2013.01); *G01P 15/123* (2013.01); *G01P 15/125* (2013.01); *H04N 5/33* (2013.01); *G01J 2005/0077* (2013.01)

(56) References Cited

U.S. PATENT DOCUMENTS

| | | | |
|---|---|---|---|
| 2008/0306705 A1* | 12/2008 | Luo | B61K 9/04 702/134 |
| 2010/0162813 A1 | 7/2010 | Chen | |
| 2010/0321501 A1 | 12/2010 | Arndt | |
| 2011/0187660 A1* | 8/2011 | Hirata et al. | 345/173 |
| 2011/0211086 A1* | 9/2011 | Mizuno et al. | 348/220.1 |
| 2012/0044467 A1* | 2/2012 | Nakayama et al. | 353/85 |

FOREIGN PATENT DOCUMENTS

| | | |
|---|---|---|
| JP | 63-61125 A | 3/1988 |
| JP | 4265080 B2 | 2/2009 |
| WO | 2007/147663 A1 | 12/2007 |
| WO | 2011/114624 A1 | 9/2011 |

\* cited by examiner

INFRARED SENSOR WITH ACCELERATION SENSOR AND METHOD FOR OPERATING AN INFRARED SENSOR

This application is a 35 U.S.C. §371 National Stage Application of PCT/EP2013/051305, filed on Jan. 24, 2013, which claims the benefit of priority to Serial No. DE 10 2012 203 440.4, filed on Mar. 5, 2012 in Germany, the disclosures of which are incorporated herein by reference in their entirety.

The disclosure relates to a system with an integrated infrared sensor and acceleration sensor, and to a method for operating an infrared sensor with an acceleration sensor, in particular for civilian applications.

BACKGROUND

Infrared sensors, particularly in the far infrared (FIR) region are used for various imaging methods, for example for pedestrian detection in land-based vehicles, or for thermal imaging cameras. The infrared sensors can be produced in an array composed of micro electromechanical structures (MEMS). The documents DE 10 2008 041 587 A1 and WO 2007/147663 A1, for example, disclose MEMS-based infrared sensors.

Apart from being used in civilian applications, infrared sensors and infrared sensor arrays can also be used in military applications, for example in imaging for the control of rockets and other military missiles. By way of example, document U.S. Pat. No. 6,279,478 B1 discloses the use of infrared sensors in an explosive missile. Consequently, infrared sensors and infrared sensor arrays are classified as so-called dual-use products and can be subject to use restrictions or export restrictions even when they are actually provided only for civilian applications.

There is thus a need for infrared sensors and infrared sensor arrays which are not suitable for military applications owing to their restricted functionality, and for methods for operating infrared sensors and infrared sensor arrays which do not permit the use of the infrared sensors and infrared sensor arrays in military applications, or have no interest therefor.

SUMMARY

In accordance with one aspect, the present disclosure provides a sensor arrangement with an infrared sensor which is designed to detect infrared radiation and to output infrared image data, and with at least one acceleration sensor which is designed to detect an instantaneous acceleration of the sensor arrangement and to output acceleration data, the output of the infrared image data from the infrared sensor being blocked when the instantaneous acceleration of the sensor arrangement exceeds a preprogrammed threshold value.

In accordance with a further aspect, the present disclosure provides a sensor system with a sensor arrangement according to the disclosure and an evaluation circuit which is designed to receive the acceleration data of the acceleration sensor and to compare the instantaneous acceleration of the sensor arrangement with the preprogrammed threshold value, and to block the output of the infrared image data from the infrared sensor for a predetermined period as a function of the comparison.

In accordance with a further aspect, the present disclosure provides a method for operating a sensor system with the steps of detecting a value of the instantaneous acceleration of the sensor system, comparing the detected value of the instantaneous acceleration with a prescribable threshold value, releasing the infrared image data of the infrared sensor when the detected value has not exceeded, or not sufficiently long exceeded, the threshold value, and blocking the infrared image data of the infrared sensor, or deactivating the infrared sensor when the detected value has exceeded the threshold value for a sufficiently long time interval.

One aspect of the present disclosure is to integrate an acceleration sensor with an infrared sensor or infrared sensor array in a sensor arrangement such that in the event of acceleration values of the sensor arrangement which exceed a prescribed threshold value, the infrared sensor or the infrared sensor array is deactivated and/or their output of sensor data is interrupted for a specific time interval. By way of example, it is possible for this purpose to provide an evaluation circuit which blocks or activates the data output of the infrared sensor or of the infrared sensor array as a function of the acceleration values determined by the acceleration sensor.

A substantial advantage of said sensor arrangement consists in that the usability for military applications can be substantially restricted by said procedure, since the acceleration values occurring in typical civilian applications are substantially lower than those occurring in typical military applications.

It is particularly advantageous to integrate the infrared sensor(s) and the acceleration sensor monolithically in a substrate. It is possible thereby, on the one hand, to save physical space and, on the other hand, to make it difficult to bypass the restricted sensor data output by modification or separation of the infrared sensor given excessively high acceleration values. By integrating the various sensors in a substrate, it is possible to pursue vertical approaches to integration, and thus to lower the manufacturing costs and simplify the production processes.

In addition thereto, the acceleration sensor can advantageously be used to determine the direction of movement of an object detected by the infrared sensor. For example, a lateral acceleration or speed of the detected object can be determined by simultaneous evaluation of the sensor data of the infrared sensor, and of the acceleration data of the acceleration sensor. This is particularly advantageous in implementing a night vision apparatus for a land-based vehicle, for example an automobile, when a moving being such as a pedestrian or a wild animal is detected moving ahead of the vehicle. Evasive measures can be taken automatically by determining the direction of movement of the pedestrian or of an animal.

In accordance with one embodiment of the sensor arrangement according to the disclosure, the infrared sensor and the at least one acceleration sensor can have micro electromechanical structures.

In accordance with a further embodiment of the sensor arrangement according to the disclosure, the infrared sensor and the at least one acceleration sensor can be integrated monolithically in a semiconductor substrate.

In accordance with a further embodiment of the sensor arrangement according to the disclosure, the at least one acceleration sensor can have piezoresistive or capacitive detecting elements.

In accordance with a further embodiment of the sensor arrangement according to the disclosure, the at least one acceleration sensor can be designed to detect an acceleration directed in the detecting direction of the infrared sensor. Military applications are frequently directed at imaging methods in the direction of movement of the infrared sensor.

Said use is effectively suppressed when determining the acceleration of the sensor system in the viewing direction of the infrared sensor, for example when a rocket is launched.

In accordance with one embodiment of the sensor system according to the disclosure, the evaluation circuit can, furthermore, be designed to block the output of the infrared image data by the infrared sensor for a predetermined period when the instantaneous acceleration of the sensor arrangement exceeds the preprogrammed threshold value by longer than a predetermined time interval. This offers the advantage that when the threshold value is exceeded briefly, for example when the device being used for the sensor system is dropped, this is not considered when activating the infrared image data.

In accordance with a further embodiment of the sensor system according to the disclosure, the prescribable threshold value can be 10 g. This offers the advantage that the sensor system remains virtually fully operational for civilian applications.

In accordance with one embodiment of the method according to the disclosure, the method can further have the step of combining the infrared image data with the detected value of the instantaneous acceleration in order to determine movement parameters of a moving object detected in the infrared image data.

Other features and advantages of embodiments of the disclosure emerge from the following description with reference to the attached drawings.

DETAILED DESCRIPTION

Figure 1:
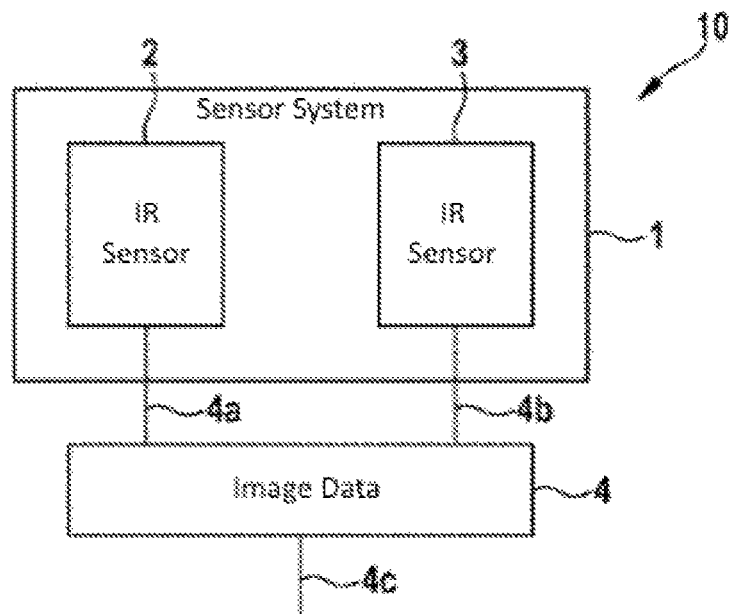
FIG. 1 is a schematic of a sensor system with an infrared sensor and an acceleration sensor in accordance with one embodiment.

FIG. 1 is a schematic of a sensor system 10 with a sensor arrangement 1 and an evaluation circuit 4. The sensor arrangement 1 can, for example, have an infrared sensor 2 or an infrared sensor array 2 and at least one acceleration sensor 3. The sensor arrangement 1 can, for example, have MEMS-based sensors and be designed, for example, using SOI technology. The number of the infrared sensors 2 or the pixels of the infrared sensor array 2, and the number of the acceleration sensors 3 are illustrated in FIG. 1 only by way of example and are not limited in principle.

The infrared sensor 2 can, for example, be designed to detect radiation in the far infrared (FIR) region from an object to be imaged, and to output infrared image data 4a. Here, the infrared sensor 2 or the infrared sensor array 2 can have a main direction of detection which is substantially perpendicular to the active surface of the sensor arrangement 1. Said main direction of detection is denoted below as viewing direction of the infrared sensor 2 or of the infrared sensor array 2.

The acceleration sensor 3 can be designed to detect an acceleration of the sensor arrangement 1 and to output values of the detected acceleration as acceleration data 4b. Here, the acceleration sensor 3 can, for example, detect accelerations which occur substantially in a direction perpendicular to the active surface of the sensor arrangement 1, that is to say in the viewing direction of the infrared sensor 2 or of the infrared sensor array 2. It is also possible to use further acceleration sensors (not illustrated explicitly in FIG. 1) which detect accelerations of the sensor arrangement 1 in other spatial directions.

The infrared image data 4a and the acceleration data 4b can be passed to the evaluation circuit 4c, which can combine the data in order to output movement parameters 4c which characterize a moving object which the infrared sensor 2 or the infrared sensor array 2 detects as an image.

The output of the infrared image data 4a by the infrared sensor 2 can be blocked when the instantaneous acceleration of the sensor arrangement 1 exceeds a prescribable threshold value, for example 10 g. For this purpose, the evaluation circuit 4 can be designed to receive the acceleration data 4b of the acceleration sensor 3 and to compare the instantaneous acceleration of the sensor arrangement 1 with the preprogrammed threshold value, and to block the output of the infrared image data 4a by the infrared sensor 2 for a predetermined period as a function of the comparison, or to temporarily deactivate the infrared sensor 2 accordingly. The predetermined period can, for example, be a few seconds.

Figure 2:
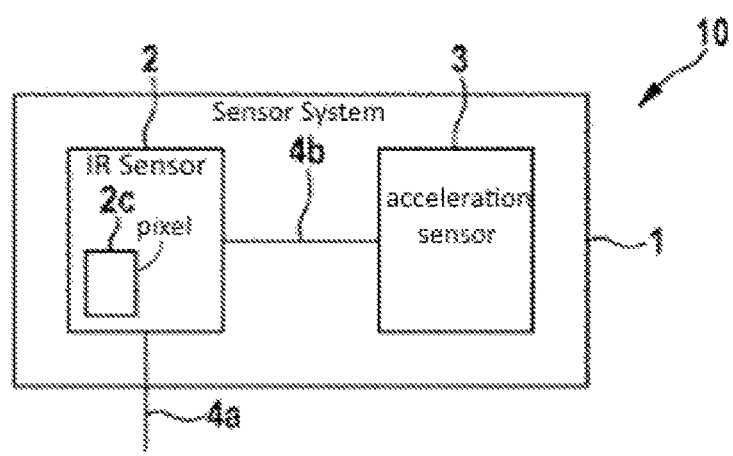
FIG. 2 is a schematic of a sensor system with an infrared sensor and an acceleration sensor in accordance with a further embodiment.

FIG. 2 is a schematic of a sensor system 10 with a sensor arrangement 1 and an evaluation circuit 4 in accordance with another exemplary embodiment. The sensor arrangement 1 can, for example, have an infrared sensor 2 or an infrared sensor array 2, and at least one acceleration sensor 3. The difference between the sensor arrangement 1 in FIG. 1 and the sensor arrangement 1 in FIG. 2 consists essentially in that there is integrated in the infrared sensor 2 or the infrared sensor array 2 an evaluation logic 2c which is designed to evaluate the acceleration data 4b of the acceleration sensor 3 and to block the output of the infrared image data 4a by the infrared sensor 2 for a predetermined period as a function of the comparison.

Figure 3:
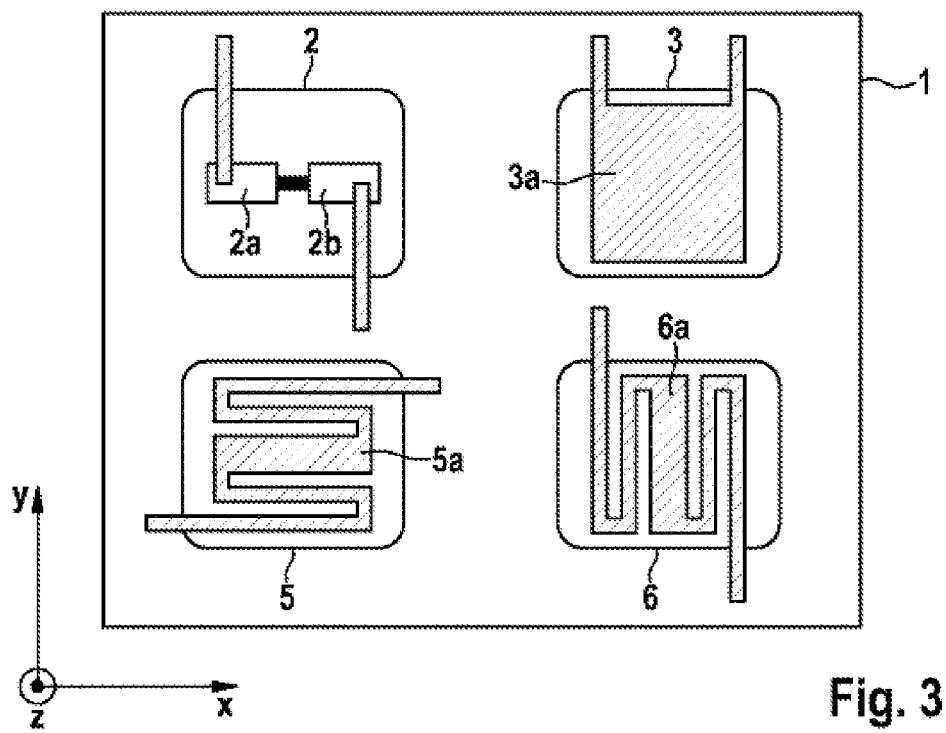
FIG. 3 is a schematic of a MEMS sensor arrangement with an infrared sensor pixel and three acceleration sensors in accordance with a further embodiment.

FIG. 3 is a schematic of a MEMS sensor arrangement 1 with one infrared sensor pixel 2 and three acceleration sensors 3, 5 and 6. The infrared sensor pixel 2 can, for example, have two series-connected diodes 2a, 2b as micro electromechanical structures (MEMS). Here, the number of the diodes 2a, 2b is, however, not limited in principle. The acceleration sensor 3 is, for example, illustrated as a z-acceleration sensor which has a MEMS detecting element 3a which can, for example, be piezo-electrically coupled to a substrate of the sensor arrangement 1. Similarly, the acceleration sensors 5 and 6 are illustrated as lateral acceleration sensors which have corresponding MEMS detecting elements 5a and 6a, respectively, which can, for example, be piezoelectrically or piezoresistively coupled to the substrate of the sensor arrangement 1. The infrared sensor pixel 2 and the three acceleration sensors 3, 5 and 6 are in this case monolithically integrated in a MEMS substrate, that is to say the MEMS functionality of the infrared sensor pixel 2 and of the three acceleration sensors 3, 5 and 6 are integrated on the same active surface of the MEMS substrate. The monolithic integration of the infrared sensor pixels 2 and the acceleration sensors 3, 5 and 6 offers the advantage that it is not directly possible to carry out a reprogramming of the mode of operation, that is to say a cancellation of the blocking of the output of infrared image data 4a given that a threshold value acceleration is exceeded.

Figure 4:
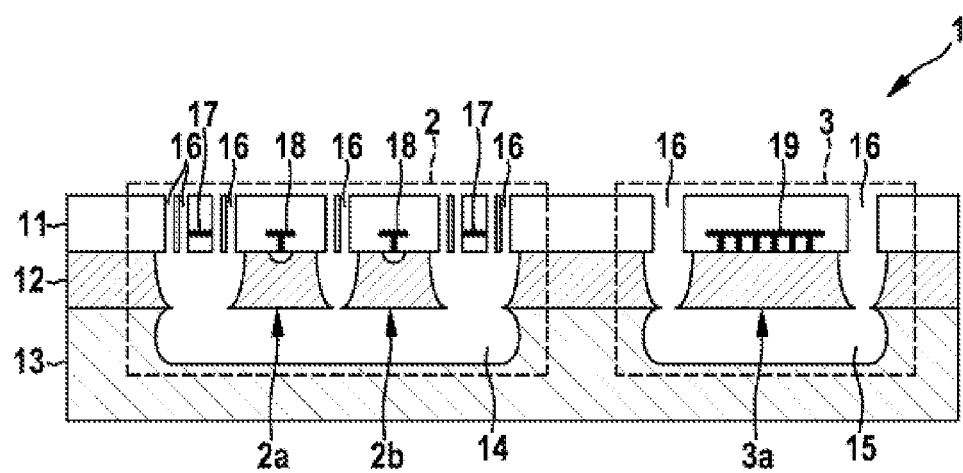
FIG. 4 is a schematic of the cross section through the sensor arrangement from FIG. 1.

FIG. 4 is a schematic of a cross sectional view through the sensor arrangement 1, in particular through the infrared sensor pixel 2 and the acceleration sensor 3. The sensor arrangement 1 can be formed on a substrate 13, for example a semiconductor substrate such as silicon. An epitaxial layer 12 or a device layer 12 (given SOI technology) can be applied to the substrate 13. An insulating layer 11, for example made from silicon oxide, can be applied over the epitaxial or device layer 12. The infrared sensor pixel 2 can have doped diode islands 2 a, 2 b which include metallization structures 18 for electrical contact. Furthermore, it is possible to provide contacting layers 17 as electrical leads to the diode islands 2 a, 2 b. Via a cavity structure 14 beneath the islands in the substrate 13 and/or the epitaxial or device layer 12, the diode islands 2 a, 2 b can be spaced apart from the substrate by a free etching step, in order to decouple the infrared sensor pixel 2 from the ambient temperature. In addition, it is possible to incorporate in the insulating layer 11 etching channels 16 by means of which free etching of the epitaxial or device layer 12 and the substrate 13 can be performed.

In the same free etching step, it is also possible to perform free etching of a cavity structure 15 beneath a detecting element 3a of the acceleration sensor 3. The detecting element 3a can constitute an inert mass of the acceleration sensor 3 and have a further metallization structure 19. The acceleration sensor 3 can, for example, be separated capacitively from the substrate 13, or be based on the piezoresistive effect. It should be clear in this case that there are many possible ways to shape an acceleration sensor 3 in a MEMS structure, and that the type of acceleration sensors 3, 5 and 6 can be freely selected in principle.

The sensor arrangement 1 can be capped while enclosing a vacuum such that the infrared sensor pixel 2 and the acceleration sensors 3, 5 and 6 are correspondingly insulated and protected against external influences.

Figure 5:
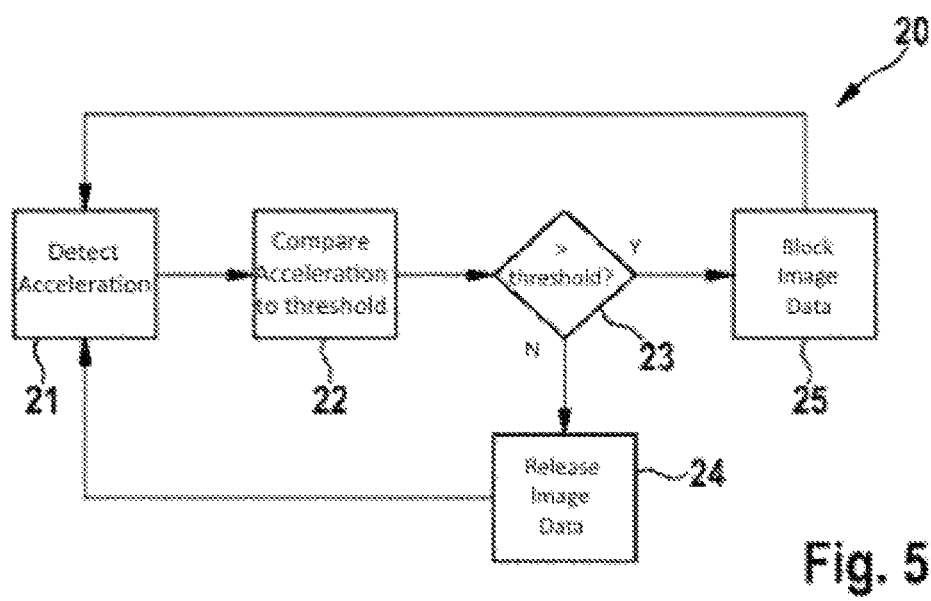
FIG. 5 is a schematic of a method for operating a sensor system in accordance with a further embodiment.

FIG. 5 is a schematic of a method 20 for operating a sensor system, in particular a sensor system 10 such as is described in conjunction with FIGS. 1 to 4. The method 20 can, for example, be used to limit the applicability of the sensor system 10 to civilian applications such as thermal imaging cameras, night vision devices or similar fields.

In a first step 21, it is possible initially to detect a value of the instantaneous acceleration of the sensor system 10 or the sensor arrangement 1. By way of example, it is possible for this purpose to evaluate output data 4b of at least one of the acceleration sensors 3, 5 and 6 of the sensor arrangement 1. Here, the evaluation can be performed by the evaluation circuit 4. In a second step 22, it is possible to compare the detected value of the instantaneous acceleration with a preprogrammed threshold value. The prescribable threshold value can in this case be defined as a function of the case of application. For example, the threshold value can be 10 g. However, it can also be possible to program a higher or lower threshold value.

It can be determined in a step 23 whether the detected value of the instantaneous acceleration exceeds the threshold value. By way of example, it is possible here to perform only a simple comparison of instantaneous values. However, it is also possible to provide that an overshooting of the threshold value is not determined until the detected value is above the threshold value for at least a prescribable time interval. The time interval can be a second, for example. The time interval can, however, also be selected to be higher or lower as a function of the case of application. Once it has been determined in step 23 that the detected value has not exceeded the threshold value, or has not exceeded it for a sufficiently long time, the release of the sensor data or infrared image data 4a of the infrared sensor 2 or the infrared sensor array 2 is effected in step 24. Thereafter, it is possible, beginning in step 21, for the acceleration values of the sensor system 10 to be rechecked or monitored.

Once it has been determined in step 23 that the detected value has exceeded the threshold value for a sufficiently long time interval, blocking of the sensor data or infrared image data 4a of the infrared sensor 2 or of the infrared sensor array 2, or deactivation of the infrared sensor 2 or of the infrared sensor array 2 is effected in step 25. Said blocking or deactivation can be maintained for a predetermined period, for example for a few seconds. Not until after the elapse of said period can the acceleration values of the sensor system 10 be checked or monitored again, starting in step 21. Consequently, the sensor system 10 is rendered useless for military applications since high acceleration values occur there frequently and over longer periods, and high frame repetition rates are required in order to be able to track fast flying objects. The military use of the sensor system 10 can be excluded by a suitable stipulation of the threshold value, while civilian uses without substantial limitations will continue to remain possible.

When suitable acceleration sensors 3, 5 or 6 are used, it is also optionally possible to combine the acceleration data 4b with the infrared image data 4a in order to image the movement of a moving object detected in the infrared image data 4a. This can be performed, for example, in the evaluation circuit 4 when lateral acceleration values of the lateral acceleration sensors 5 and/or 6 are present. The evaluation circuit 4 can then output movement parameters 4c of the vehicle or device so that when the sensor system 10 is used, for example, in a night vision device of a vehicle, it is possible to take measures on the basis of the movement trajectories when the infrared sensor 2 has detected a pedestrian, an animal or one some moving object.

The invention claimed is:

1. A sensor arrangement comprising:
    an infrared sensor configured to detect infrared radiation and to output infrared image data;
    at least one acceleration sensor configured to detect an instantaneous acceleration of the sensor arrangement and to output acceleration data;
    an evaluation circuit coupled to the infrared sensor and the at least one acceleration sensor and configured to compare the instantaneous acceleration of the acceleration data with a predetermined threshold value and block the output of the infrared image data from the infrared sensor for a predetermined period when the instantaneous acceleration of the sensor arrangement exceeds the predetermined threshold value.

2. The sensor arrangement as claimed in claim 1, wherein the infrared sensor and the at least one acceleration sensor have micro electromechanical structures.

3. The sensor arrangement as claimed in claim 2, wherein the infrared sensor and the at least one acceleration sensor are integrated monolithically in a semiconductor substrate.

4. The sensor arrangement as claimed in claim 2, wherein the at least one acceleration sensor has one of piezoresistive detecting elements and capacitive detecting elements.

5. The sensor arrangement as claimed in claim 1, wherein the at least one acceleration sensor is configured to detect an acceleration directed in a detecting direction of the infrared sensor.

6. A sensor system, comprising:
   a sensor arrangement including:
   (i) an infrared sensor configured to detect infrared radiation and to output infrared image data; and
   (ii) at least one acceleration sensor configured to detect an instantaneous acceleration of the sensor arrangement and to output acceleration data; and
   an evaluation circuit configured to:
   (i) receive the acceleration data output from the at least one acceleration sensor;
   (ii) compare the instantaneous acceleration of the acceleration data with a prescribable threshold value; and
   (iii) block the output of the infrared image data from the infrared sensor for a predetermined period as a function of the comparison.

7. The sensor system as claimed in claim 6, wherein the evaluation circuit is configured to block the output of the infrared image data from the infrared sensor for the predetermined period when the instantaneous acceleration of the sensor arrangement exceeds the prescribable threshold value by longer than a predetermined time interval.

8. The sensor system as claimed in claim 7, wherein the prescribable threshold value is 10 g.

9. A method for operating a sensor system including a sensor arrangement and an evaluation circuit, the sensor arrangement having an infrared sensor, and at least one acceleration sensor, the method comprising:
   detecting a value of an instantaneous acceleration of the sensor system with the at least one acceleration sensor;
   comparing the detected value of the instantaneous acceleration with a prescribable threshold value with the evaluation circuit;
   releasing infrared image data detected by the infrared sensor when the detected value of the instantaneous acceleration has not exceeded the threshold value, or only exceeded the threshold value for a time interval less than a predetermined fixed time interval; and
   blocking the infrared image data detected by the infrared sensor for a predetermined time period when the detected value of the instantaneous acceleration has exceeded the threshold value for a time interval greater than the predetermined fixed time interval.

10. The method as claimed in claim 9, further comprising:
   combining the infrared image data with the detected value of the instantaneous acceleration in order to determine movement parameters of a moving object detected in the infrared image data.

* * * * *